US009846855B2

(12) United States Patent
Rogers et al.

(10) Patent No.: US 9,846,855 B2
(45) Date of Patent: Dec. 19, 2017

(54) TRACKING WELLBORE SERVICING EQUIPMENT AND COMPONENTS THEREOF

(71) Applicant: Halliburton Energy Services, Inc., Houston, TX (US)

(72) Inventors: Phillip A. Rogers, Duncan, OK (US); Stanley V. Stephenson, Duncan, OK (US); Keith A. Frost, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/030,959

(22) PCT Filed: Nov. 21, 2013

(86) PCT No.: PCT/US2013/071164
§ 371 (c)(1),
(2) Date: Apr. 21, 2016

(87) PCT Pub. No.: WO2015/076803
PCT Pub. Date: May 28, 2015

(65) Prior Publication Data
US 2016/0247117 A1    Aug. 25, 2016

(51) Int. Cl.
*G06F 19/00*    (2011.01)
*G06Q 10/08*    (2012.01)
(Continued)

(52) U.S. Cl.
CPC ........... *G06Q 10/087* (2013.01); *E21B 41/00* (2013.01); *E21B 47/00* (2013.01);
(Continued)

(58) Field of Classification Search
CPC ............ G06Q 10/087; G06K 7/10366; G06K 2017/007; G06K 19/07758; E21B 47/122; E21B 47/124
See application file for complete search history.

(56) References Cited

U.S. PATENT DOCUMENTS 7,619,523 B2 * 11/2009 Durtschi ............. G06Q 10/087
340/572.1
8,302,686 B2 * 11/2012 Roddy .................... E21B 33/13
166/250.01
(Continued)

FOREIGN PATENT DOCUMENTS

WO    2015/041643 A1    3/2015
WO    2015/094190 A1    6/2015

OTHER PUBLICATIONS

International Search Report and Written Opinion issued in related PCT Application No. PCT/US2013/071164 dated Aug. 25, 2014, 15 pages.

*Primary Examiner* — Thien M Le
*Assistant Examiner* — April Taylor
(74) *Attorney, Agent, or Firm* — John W. Wustenberg; Baker Botts L.L.P.

(57) ABSTRACT

Tracking and associating consumable components with the respective pieces of wellbore servicing equipment to which they are coupled may include using identifier tags coupled to each piece of wellbore servicing equipment and to each consumable component. An identifier tag reader may be used to read both the identifier tag of the piece of wellbore servicing equipment and the identifier tag of the consumable component, thereby enabling association of the consumable component to the piece of wellbore servicing equipment to which it is coupled, for the duration of such coupling. Such association may be carried out and/or tracked in one or more databases, wherein other information pertaining to either
(Continued)

piece of equipment may be associated with both pieces of equipment. In addition, usable life spans of consumable components may be more easily determined based at least in part on such association.

18 Claims, 6 Drawing Sheets

(51) Int. Cl.
*E21B 47/00* (2012.01)
*G06Q 10/00* (2012.01)
*E21B 41/00* (2006.01)
*G06K 7/10* (2006.01)
*G06K 19/077* (2006.01)
*G06K 17/00* (2006.01)

(52) U.S. Cl.
CPC ... *G06K 7/10366* (2013.01); *G06K 19/07758* (2013.01); *G06Q 10/00* (2013.01); *G06K 2017/007* (2013.01); *G06K 2017/0048* (2013.01)

(56) References Cited

U.S. PATENT DOCUMENTS

| | | | |
|---|---|---|---|
| 8,347,957 | B2 | 1/2013 | Stephenson et al. |
| 2008/0126171 | A1 | 5/2008 | Baldwin et al. |
| 2009/0102612 | A1 | 4/2009 | Dalbow et al. |
| 2009/0121895 | A1 | 5/2009 | Denny et al. |
| 2009/0205820 | A1* | 8/2009 | Koederitz ............... E21B 10/00 166/250.01 |
| 2013/0045017 | A1 | 2/2013 | Hayakawa et al. |
| 2013/0255938 | A1 | 10/2013 | Neer |
| 2016/0290127 | A1* | 10/2016 | Stephenson ............. E21B 41/00 |
| 2017/0116654 | A1* | 4/2017 | Atwood ............. G06Q 30/0607 |

\* cited by examiner

| | | |
|---|---|---|
| Serial Number: | 00005D | |
| Unique ID: | XYZ-B1234PUMP | |
| Size: | 10 bbl/min | |
| Description: | Pump Unit | |
| Current Status: | Inspected | |
| Next Inspection: | 5/30/2014 | |
| Location: | Sub Location: | Last Scan Date |
| Permian Basin | Hobbs, NM | 5/8/2014 |

Fig. 7

| 720 | Serial Number: | 00005D | |
|---|---|---|---|
| 611 | Unique ID: | XYZ-B1234PUMP | |
| 723 | Size: | 10 bbl/min | |
| 724 | Description: | Pump Unit | |
| 725 | Current Status: | Inspected | |
| 732 | Next Inspection: | 5/30/2014 | |
| 621 | Associated ID: | XYZ-B238FLUIDEND | |
| 622 | Associated Serial No. | 00033F | |
| 726 | Location: | Sub Location: | Last Scan Date |
| | Permian Basin | Hobbs, NM | 5/8/2014 |

| 720 | Serial Number: | 00005D | |
|---|---|---|---|
| 611 | Unique ID: | XYZ-B1234PUMP | |
| 723 | Size: | 10 bbl/min | |
| 724 | Description: | Pump Unit | |
| 725 | Current Status: | Inspected | |
| 732 | Next Inspection: | 5/30/2014 | |
| 726 | Location: | Sub Location: | Last Scan Date |
| | Permian Basin | Hobbs, NM | 5/8/2014 |
| | Consumable Component History | | |
| | Date | Associated ID No. | Associated Ser No. |
| | 3/1/2014 | ABC-D238FLUIDEND | 00032F |
| | 5/8/2014 | XYZ-B238FLUIDEND | 00033F |

TRACKING WELLBORE SERVICING EQUIPMENT AND COMPONENTS THEREOF

CROSS-REFERENCE TO RELATED APPLICATION

The present application is a U.S. National Stage Application of International Application No. PCT/US2013/071164 filed Nov. 21, 2013, which is incorporated herein by reference in its entirety for all purposes.

BACKGROUND

The present invention relates generally to operations performed and equipment utilized in conjunction with wellbore operations and, in particular, systems and methods for servicing a wellbore and wellbore servicing equipment.

A wellbore servicing system may include wellbore servicing equipment, such as a trailer or truck, an engine, a transmission, a pump, a power end on the pump, and a fluid end on the pump. Wellbore servicing equipment failures may occur during performance of a wellbore servicing operation. Such equipment failures may result in a variety of problems including, among other things, causing inconvenient time delays in performing the wellbore servicing operation, unexpected and/or undesirable timing and expense of equipment repairs, and/or damage to the wellbore and the associated subterranean formation being treated in the wellbore servicing operation. Further, since the wellbore servicing equipment may fail while being used for a wellbore servicing operation, it is not uncommon to mobilize more equipment than needed for the treatment to ensure sufficient equipment is available if there are any wellbore servicing equipment failures during the treatment.

In some cases, all mobilized pumping equipment may be used at relatively lower loads, but if some pumping equipment fails, the loads on at least some of the remaining pumping equipment may be increased. In other cases, some of the pumping equipment may be left offline until needed due to a failure of other pumping equipment. While mobilizing additional wellbore servicing equipment to a particular wellbore servicing operation may provide relief when some equipment fails, current systems and methods of selecting equipment may lead to provisioning too little or too much equipment for a wellbore servicing operation. Providing too much or too little for a wellbore servicing operation may result in increased cost of the wellbore servicing operation and/or a misappropriation of equipment such that the additional equipment is not well utilized.

A wellbore servicing system may also include methods of calculating remaining life estimates of the wellbore servicing equipment and/or probability of survival estimates for the wellbore servicing equipment. This may be done by gathering usage and load information from the well servicing equipment in the field, collecting the data in a central repository, analyzing the data, and using the resulting data analysis to track utilization of wellbore servicing equipment to predict equipment maintenance schedules, plan for future equipment needs, prepare for equipment obsolescence, and other similar tasks. Tracking utilization of wellbore servicing equipment is at least in part dependent on the install data of the equipment to accurately measure the utilization and remaining life of the equipment. Currently, tracking install data is dependent on accurate and timely manual entries of installation dates into the central repository. In addition, when a piece of equipment is moved, e.g., from one pumping unit to another, it is increasingly difficult to keep track of the install data for that piece of equipment.

BRIEF DESCRIPTION OF THE DRAWINGS

FIG. 7 is an abstract illustration of a data structure according to some aspects of the present disclosure.

FIGS. 8A and 8B are abstract illustrations of data structures according to some aspects of the present disclosure.

Figure 1:
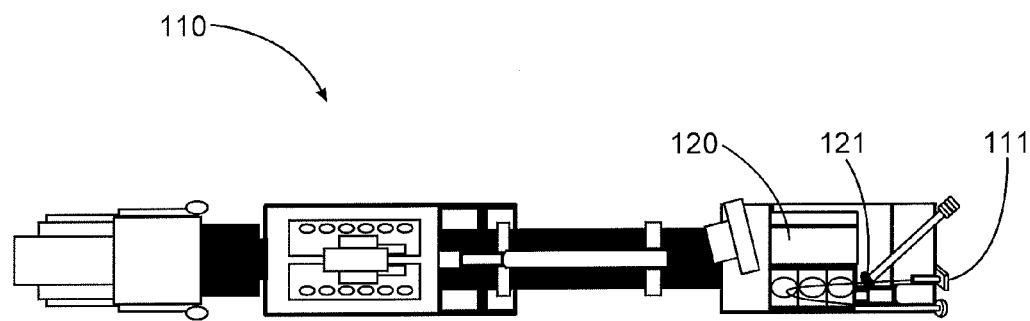
FIG. 1 is an overhead diagram depicting identifier tags and wellbore servicing equipment according to some aspects of the present disclosure.

While embodiments of this disclosure have been depicted and described and are defined by reference to exemplary embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells, monitoring wells, and production wells, including hydrocarbon or geothermal wells. Embodiments may also be applicable to distributed acoustic systems that monitor other structures such as subsea risers, subsea umbilical cables, marine towed fiber(s), or trenched fiber(s) used in perimeter security and/or tracking of migratory animals.

The terms "couple" or "couples" as used herein are intended to mean either an indirect or a direct connection or incorporation. Thus, if a first device couples to a second device, that connection or incorporation may be through a direct connection, or through an indirect mechanical, acoustical, or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

As would be appreciated by those of ordinary skill in the art, with the benefit of this disclosure, one or more information handling systems may be used to implement the methods disclosed herein. Specifically, the one or more information handling systems may include machine-readable instructions to perform the methods disclosed herein. In certain embodiments, the different information handling systems may be communicatively coupled through a wired or wireless system to facilitate data transmission between the different subsystems. The structure and operation of such wired or wireless communication systems is well known to those of ordinary skill in the art having the benefit of the present disclosure and will therefore, not be discussed in detail herein. Moreover, each information handling system may include storage media and/or memory and may be any computer-readable media that stores data either permanently or temporarily.

For the purposes of this disclosure, storage media and/or memory may include any one or a combination of volatile or nonvolatile local or remote devices suitable for storing information. For example, storage media and/or memory may include a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), a solid state drive ("SSD"), flash memory, magnetic storage devices, optical storage devices, network storage devices, cloud storage devices, or any other suitable information storage device or a combination of these devices.

The present application relates generally to operations performed and equipment utilized in conjunction with wellbore operations and, in particular, systems and methods for servicing a wellbore and wellbore servicing equipment. Specifically, the present disclosure provides systems and methods for improved tracking of wellbore servicing equipment of a wellbore servicing system.

The present disclosure provides systems and methods for tracking the utilization of wellbore servicing equipment by coupling a first identifier tag to a first piece of equipment; by coupling a second identifier tag to a second piece of equipment; and by scanning both the first and second identifier tags so as to associate the two tags (and thereby associate the identities of the pieces of equipment to which those tags are coupled, for example by association in one or more databases). The systems and methods may further include tracking various types of operation data associated with either or both of the first and second pieces of equipment, and further associating such operation data with each respective piece of equipment. Such tracking and association may similarly take place and/or be carried out by one or more databases.

Wellbore Servicing Equipment and Consumable Components

In some embodiments, the present disclosure includes a first identifier tag coupled to a first piece of wellbore servicing equipment and a second identifier tag coupled to a second piece of wellbore servicing equipment. In certain embodiments, the second piece of wellbore servicing equipment may be a consumable, frequently moved, and/or frequently substituted component of the first piece of equipment. Such a component is herein referred to as a "consumable component," and a "consumable component of a piece of wellbore servicing equipment" is accordingly a component that is compatible with—e.g., capable of being operatively coupled and decoupled with—the piece of wellbore servicing equipment. Further, "frequently moved" is not meant to imply a particular numerical frequency or time period between moving and/or substitution. Rather, a consumable component may be incorporated within, or otherwise coupled to, a piece of equipment generally for a time period shorter than the usual or expected lifespan of the piece of equipment (such that more than one consumable component will in typical practice be incorporated in or otherwise coupled to the piece of equipment in succession over the lifetime of the piece of equipment). Consumable components may be disposed of after failure or replacement, and may have generally shorter usable life spans than the piece of equipment within which it is incorporated (or to which it is otherwise coupled). For example, by reference to FIG. 1, in some specific embodiments the first identifier tag 111 may be coupled to a first piece of servicing equipment (shown in FIG. 1 as pumping unit 110), and the second identifier tag 121 may be coupled to a consumable component of the first piece of servicing equipment (shown in FIG. 1 as fluid end 120 of the pumping unit 110). A fluid end may necessitate frequent change-out due to factors such as heightened wear-and-tear (e.g., after 3 to 6 months of use), meaning that multiple fluid ends may be substituted in succession for use in the pumping unit 110 during the course of the usable lifetime of the pumping unit 110. Of course, fluid end change-out frequency may vary based upon operating conditions, such as pressure, rate, and duty cycle. For example, 24-hour operation at high horsepower may necessitate fluid end change-out more frequently than every 3 months, while at the same time a fluid end seeing intermittent, low-pressure use may last years.

Thus, some embodiments of the present disclosure may include: a first identifier tag coupled to a first piece of wellbore servicing equipment; a second identifier tag coupled to a first consumable component of the first piece of wellbore servicing equipment; and a third identifier tag coupled to a second consumable component of the first piece of wellbore servicing equipment, wherein the first piece of wellbore servicing equipment comprises the first consumable component at a first time, and the first piece of wellbore servicing equipment comprises the second consumable component at a second time subsequent to the first time.

Other examples of consumable components—and their respective corresponding servicing equipment—may include: an engine (consumable component) incorporated within a truck (piece of wellbore servicing equipment); a transmission incorporated within a truck; a radiator incorporated within a truck; a cooling fan incorporated within a truck; a power end incorporated within a pump; a gear reducer incorporated within a pump; a valve incorporated within a pumping unit; and a valve seat incorporated within a pumping unit. In some instances, a first consumable component may serve as a piece of equipment with longer life span relative to a nested consumable component incorporated within the first consumable component. For example, valves and/or valve seats may be incorporated within a fluid end of a pump; and/or a gear reducer may be incorporated within a power end of a pump.

Identifier Tags

Figure 2:
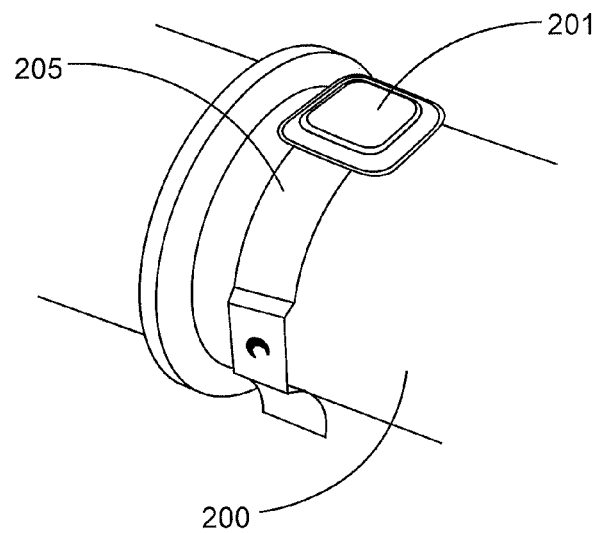
FIG. 2 is a diagram depicting an identifier tag according to some aspects of the present disclosure.

As noted previously, first and second identifier tags (e.g., identifier tags 111 and 121, respectively) may be coupled to a piece of wellbore servicing equipment and its coupled consumable component, respectively (e.g., pumping unit 110 and fluid end 120). In some embodiments, an identifier tag may be attached to a surface of the piece of wellbore servicing equipment or a consumable component. In other embodiments, an identifier tag may be located within or otherwise incorporated within the piece of wellbore servicing equipment or a consumable component. Each identifier tag may in some embodiments include any one or more of the features set out in the immediately ensuing description; therefore, the immediately ensuing description will focus on only a single exemplary identifier tag 201 (as shown in FIG. 2), which may be used as any one of the various identifier tags of certain embodiments (e.g., identifier tag 111, or identifier tag 121). An identifier tag 201 may be coupled to a piece of equipment 200 (either wellbore servicing equipment or consumable component) through any of various means. For example, such coupling may be through physical attachment of the identifier tag to the piece of equipment—such as strapping the identifier tag to the piece of equipment via strap 205 (as shown in FIG. 2); embedding the identifier tag in the piece of equipment 200 by installing the identifier tag 201 in a hole, depression, or other surface location in or on the piece of equipment 200; adhering the identifier tag 201 to the piece of equipment 200 using adhesive (e.g., commercially available adhesive); or through any other means for physically connecting the identifier tag 201 to its associated piece of equipment 200. An identifier tag 201 may in some embodiments comprise a chip or other electronic device suitable for storing identification information unique to the tag, and it may further include means of transmitting such information, and/or means for allowing such information to be read, scanned, or otherwise received by another device. For example, an identifier tag of some embodiments may comprise a Radio Frequency Identifier ("RFID") chip or tag, such as any commercially available RFID chip or tag.

Figure 3:
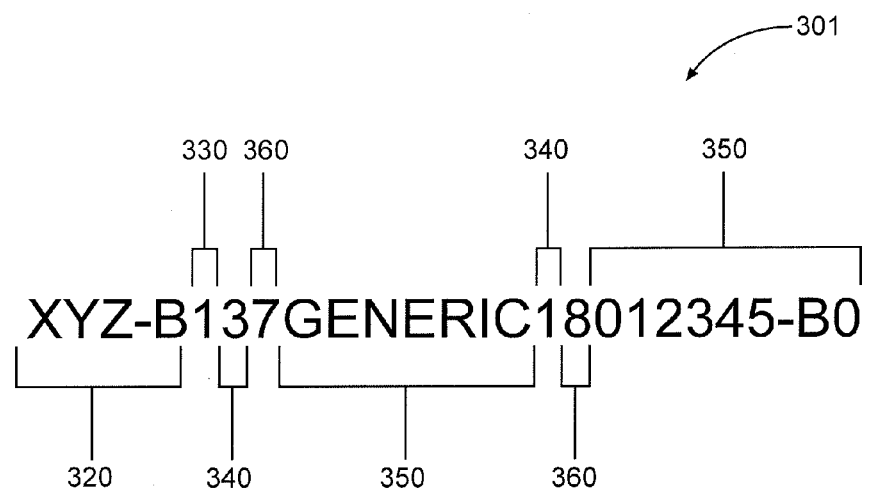
FIG. 3 is an alphanumeric sequence illustrating an exemplary unique identifier according to some aspects of the present disclosure.

Each identifier tag 201 may include a unique identifier. For example, where the identifier tag 201 is an RFID tag, the RFID tag may include a unique identifier 301, as shown in FIG. 3. The unique identifier of some embodiments may be a unique alpha-numeric code with a fixed length (as shown in FIG. 3). The unique identifier 301 may uniquely identify the piece of equipment and/or component to which the identifier tag 201 is coupled. In some embodiments, the unique identifier 301 may enable association of the identifier tag 201 with the specific piece of equipment to which the identifier tag 201 is coupled. This may be done, for example, by associating the unique identifier 301 with any one or more pieces of unique identifying information of the piece of equipment (e.g., equipment serial number, equipment manufacturer, equipment model number, etc.). Such association in some embodiments may be carried out in any one or more databases—for example, by including within a single database entry (i) the unique identifier 301 and (ii) the one or more pieces of unique identifying information for the piece of equipment, such that look-up in a database of either (i) the unique identifier 301 or (ii) the one or more pieces of unique identifying information could return the single database entry (and all associated information). Databases according to some embodiments of the present disclosure are discussed in greater detail below.

In yet other embodiments, association of the unique identifier 301 with any one or more pieces of unique identifying information of the piece of equipment may be carried out by embedding the unique identifying information within the unique identifier 301. An example of this means of association is shown in FIG. 3, in which the unique identifier 301 is exemplified by an alpha-numeric code. In such embodiments, the unique identifier 301 may be made up of a number of data sections, where each data section contains a specific type of information. Unique identifier data sections maybe in various positions within the unique identifier 301. In certain embodiments of the unique identifier, a protocol ID section 320 may denote the protocol used by the unique identifier 301. The protocol in some embodiments may be an arbitrary identification of a standard, such as a standard for organizing the data read from and/or written to the unique identifier 301. In such embodiments, identifier tags 201 used for other applications can be universally read and written, with no other formats existing, thereby simplifying the process of reading and/or writing information to and from the unique identifier 301. Returning to the unique identifier 301, an equipment class section 330 of the unique identifier 301 may identify the class of the piece of equipment to which the identifier tag 201 is coupled, and with which the unique identifier 301 is associated. In certain embodiments, the equipment class section 330 may include a designation for equipment type: e.g., pumping unit, engine, transmission, truck, fluid end, or any other class of equipment which may be desired to track. A data load type section 340 may identify the type of data contained in the following actual data section 350. A data load length section 360 may contain the number of characters contained in the following actual data section 350. The actual data section 350 may contain any data associated with the piece of equipment that would be desired to communicate, including manufacturer and serial number. Further, as in the example shown in FIG. 3, a unique identifier 301 may include multiple actual data sections 350 (and therefore also include multiple data load type sections 340 and data load length sections 360).

Identifier Tag Readers and Associating Unique Identifiers

Figure 4:
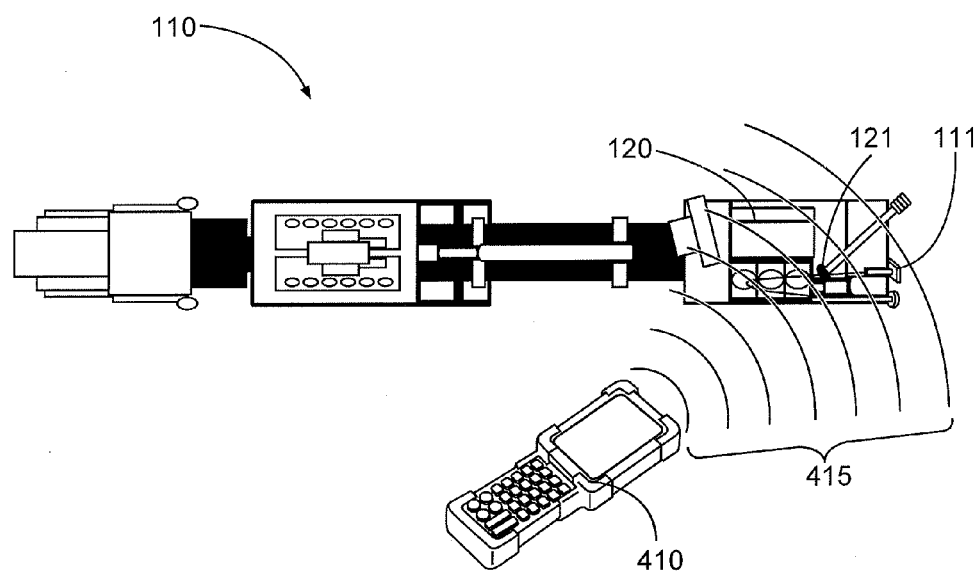
FIG. 4 is a diagram depicting an identifier tag reader and identifier tags on wellbore servicing equipment according to some aspects of the present disclosure.

Each identifier tag 201 may be read by an identifier tag reader. In certain embodiments the identifier tag reader may be a standard warehouse bar code scanner with RFID antenna attachment or any other handheld device capable of reading an identifier tag 201 (e.g., an RFID tag reader). For example, the identifier tag reader may be a Motorola 9090z or a Motorola 9190z. Referring to FIG. 4, in some embodiments, the identifier tag reader 410 may be capable of reading multiple identifier tags in a single reading operation, e.g., at a single time. For example, the identifier tag reader 410 may in a single scan (or other reading operation) at a first time read both: a first identifier tag 111 coupled to a piece of wellbore servicing equipment 110; and a second identifier tag 121 coupled to a consumable component 120 incorporated in or otherwise coupled to the piece of wellbore servicing equipment 110. Thus, the range 415 of a scan may be such that it is capable of scanning both tags 111 and 121. In some embodiments, the scan range 415 may be small enough such that the identifier tag reader 410 is unlikely to scan more than the two tags 111 and 121 coupled respectively with the piece of wellbore servicing equipment 110 and consumable component 120. This range 415 may vary depending upon the application, but acceptable ranges will be apparent to one of ordinary skill in the art with the benefit of this disclosure. For example, suitable scanning ranges may be 15 feet or less; 10 feet or less; or 5 feet or less. In some applications, suitable scan ranges may be larger, e.g., 50 feet or less, or 100 feet or less. Desirable scan ranges may depend at least in part upon the layout and type of wellbore servicing equipment and/or consumable components the tags of which are being scanned.

By scanning or otherwise reading both the first and second identifier tags 111 and 121, each tag's unique identifier may be received by the identifier tag reader 410. This enables association of the first and second unique identifiers of identifier tags 111 and 121, respectively. And since, as discussed previously, each identifier tag's unique identifier uniquely identifies the specific piece of equipment to which the identifier tag is coupled, this dual scanning accordingly enables association of the piece of wellbore servicing equipment 110 (to which the first identifier tag 111 is coupled) and the consumable component 120 incorporated therein (to which the second identifier tag 121 is coupled). Thus, association of a piece of wellbore servicing equipment 110 and a consumable component 120 may take place directly, and/or it may take place indirectly (e.g., by way of association of the first identifier tag 111 with the second identifier tag 121, and/or by way of association of the first and second unique identifiers of the respective first and second identifier tags). Furthermore, in some embodiments, association may be time-specific; that is, the association of wellbore servicing equipment 110 to consumable component 120 (and/or association of their respective unique identifiers) may be specific to the date and/or time of the dual scan of both the first and second identifier tags 111 and 121. Such time-specific association may, for example, include associating the first identifier, the second identifier, and the time of the scan of both identifiers.

Figure 5:
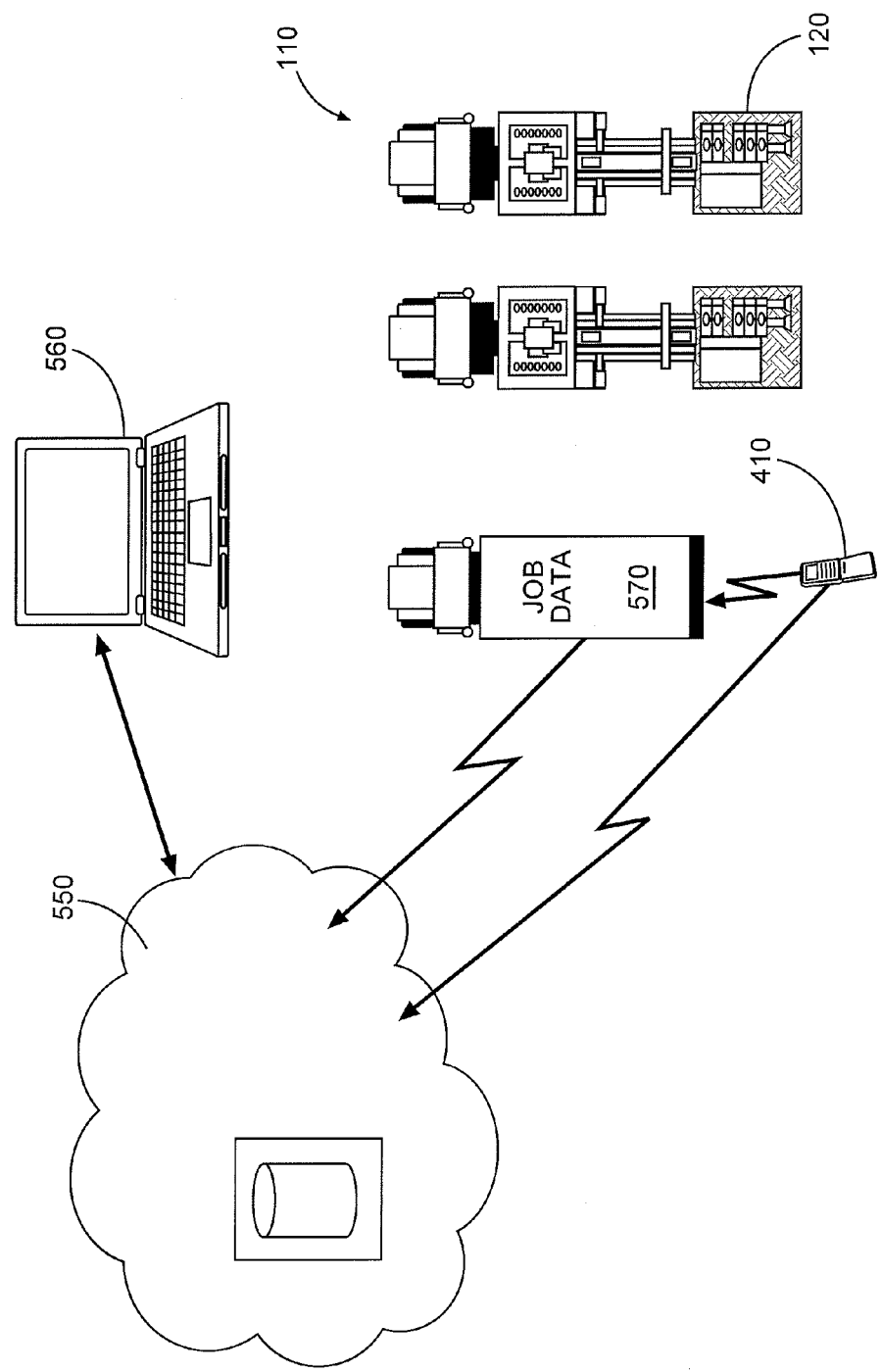
FIG. 5 is a diagram depicting some elements of a job site and related information handling systems according to some aspects of the present disclosure.

Association may be facilitated at least in part by one or more communicative couplings. FIG. 5 is a diagram illustrating various communicative couplings, among other things, at a job site according to some aspects of the present disclosure. In some embodiments, as exemplified in FIG. 5, the identifier tag reader 410 may be communicatively coupled (or may be capable of communicatively coupling) to any one or more of: a job-site information handling system 570 and a remote device 560, any one or more of which may be an information handling system as previously described. Furthermore, any two or more of the job-site information handling system 570; the remote device 560; and the centralized database 550 may be communicatively coupled to each other. Particular examples of a suitable remote device 560 or a job-site information handling system 570 may include a computer (e.g., a personal computer, laptop, or the like), tablet, handheld device, RFID reader, or any other information handling system with capability for receiving and viewing information. The job-site information handling system 570 may additionally be capable of serving as a mobile command center, e.g., it may be capable of receiving and processing various information from a job site, including one or more unique identifiers 301 from each of various identifier tags 201. Furthermore, a central database 550 may reside on and/or be accessible by any one or more of the identifier tag reader 410, the job-site information handling system 570, and the remote device 560. In some embodiments, the central database 550 may reside on another information handling system, and/or a network of information handling systems, which may be remote from the job site. In various embodiments, any one or more of the identifier tag reader 410, the job-site information handling system 570, and the remote device 560 may be capable of accessing and/or displaying to information from the central database 550. In addition, in certain embodiments, the identifier tag reader 410 may be both communicatively coupled to and located within either of the job-site information handling system 570 and the remote device 560.

As shown in FIG. 5, the identifier tag reader 410 is communicatively coupled to the job-site information handling system 570 and to the central database 550. The job-site information handling system 570 is also communicatively coupled to the central database 550, and the remote device 560 is also communicatively coupled to the central database 550. Any one or more of the identifier tag reader 410, the job-site information handling system 570, the remote device 560, and the central database 550 may be capable of receiving unique identifiers 301 from each of various identifier tags 201. Further, although the communicative couplings of FIG. 5 are illustrative of some embodiments, any other combination of any one or more communicative couplings may be present in other embodiments, each coupling being between two or more of the identifier tag reader 410, the job-site information handling system 570, the remote device 560, and the central database 550.

In various embodiments, association of the piece of wellbore servicing equipment (e.g., equipment 110) and the consumable component (e.g., consumable component 120) may take place in, and/or be carried out at least in part by, any one or more of: the identifier tag reader 410; the job-site information handling system 570; the remote device 560; and the central database 550.

Figure 6A:
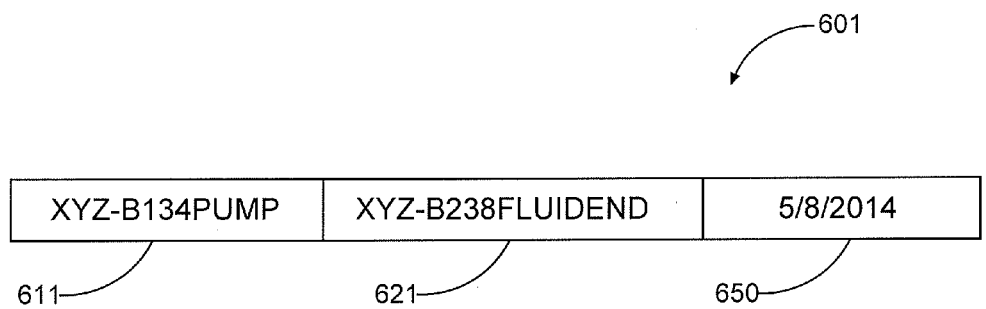
FIGS. 6A and 6B are abstract illustrations of data structures according to some aspects of the present disclosure.
Figure 6B:
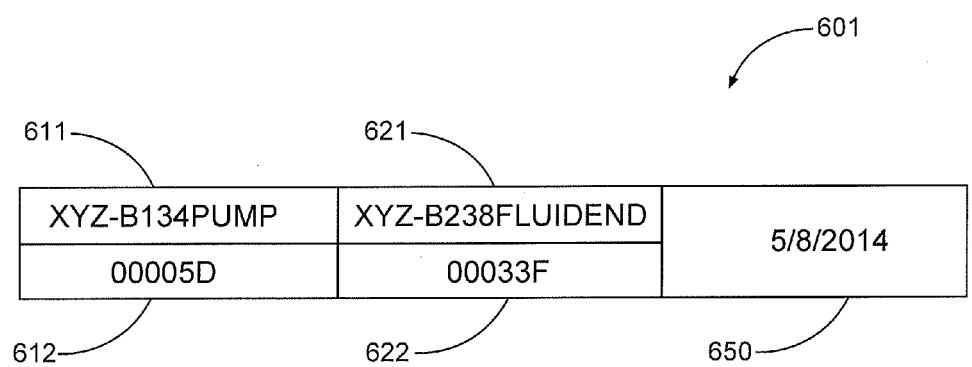

A first example of association of wellbore servicing equipment with a consumable component may be illustrated by the use of a first database and a second database. As shown by reference to FIG. 6A, a first database, which may be a consumable component database, may be populated with one or more entries 601, each entry 601 comprising: (i) a first unique identifier 611 of an identifier tag 111 coupled to a piece of wellbore servicing equipment 110 and (ii) a second unique identifier 621 of an identifier tag 121 coupled to a consumable component 120 of the piece of wellbore servicing equipment 110. The first and second unique identifiers 611 and 621 of each entry 601 may correspond to a pair of identifier tags 111 and 121 scanned in a dual-scan operation as described previously, so as to enable association of the two unique identifiers 611 and 621 in entry 601. Each entry 601 may further comprise a date and/or time of scan 650. The first database entry 601 may in some embodiments include additional information, e.g., information associated with each of unique identifiers 611 and 621. For example, FIG. 6B shows an entry 601 of the first database including the first and second unique identifiers 611 and 621, and in addition showing: (i) a serial number 612 of piece of wellbore servicing equipment 110 associated with the unique identifier 611 (e.g., by any means previously described with regard to associating an identifier tag with a specific piece of equipment), and (ii) a serial number 622 of consumable component 121 associated with unique identifier 621. This first database may be capable of receiving unique identifier data from the identifier tag scanner 410 by any suitable means. For example, it may be stored on, and/or accessible by, the tag scanner 410. Or, it may be stored on, and/or accessible by, a job-site information handling system 570, which in turn is capable of receiving unique identifiers from tag scanner 410. Various other examples of first database storage and/or accessibility will be apparent to those skilled in the art with the benefit of this disclosure. In either of the examples depicted in FIGS. 6A and 6B, each entry 601 in the first database serves as a means for time-specific association of the piece of wellbore servicing equipment 110 with the consumable component 120 currently coupled to it at the time of scan 650.

The association of first unique identifier 611 with second unique identifier 621 in the first database enables linkage, further population, or other means of merging entry 601 of the first database with an entry of a second database having at least one common piece of data (e.g., unique identifier 611) with the first entry 601. In some embodiments, the second database may be central database 550. A central database 550 according to some embodiments may be described in part by reference to FIG. 7. Central database 550 may in some embodiments include one or more entries 701, each entry 701 comprising a first unique identifier 611 of an identifier tag 111 coupled to a piece of wellbore servicing equipment 110. Each such entry may further comprise any one or more pieces of unique identifying information and/or descriptive information for the piece of equipment 110, as noted previously with regard to associating an identifier tag with a specific piece of equipment. In the example embodiment shown in FIG. 7, entry 701 includes a serial number 720 for the piece of equipment, as well as size 723, description 724, a status indicator 725, a scheduling indicator 732, a location entry 726, a sub location entry 728, and a date of last scan 730.

Other and/or different information associated with the piece of wellbore servicing equipment 110 may be included in an entry 701 according to some embodiments. For example, a piece of wellbore servicing equipment 110 (e.g., a pumping unit) may include or may be communicatively coupled to an information handling system that is capable of tracking various "job information" related to the equipment's operation. Such an information handling system may for example be—and/or it may be capable of communicatively coupling to—either of a job-site information handling system 570 and a remote device 560. "Job information" may include any operating parameters, data, and/or history of a piece of wellbore servicing equipment or consumable component. In certain embodiments, job information may be specific to the type of equipment or component. For example, where a piece of equipment 110 is a pump unit, the pump unit (and/or an information handling system coupled thereto) may track any one or more of the type, pressure, amount, and flow rate of fluid pumped during a job, and/or the time of the unit's operation during the job. This job information may be transmitted directly or indirectly, e.g., to the central database 550 for inclusion in an entry 701 for the unique identifier 611 associated with the identifier tag 111 coupled to that piece of equipment 110. Other examples of job information include, but are not limited to: total engine hours, hours spent in each gear (e.g., for a truck or other engine), fuel usage, fuel type, and the like. Furthermore, in some embodiments, any of the aforementioned other and/or different information associated with the piece of wellbore servicing equipment 110, such as job information, may likewise be tracked for, and/or associated with, a consumable component 120 (e.g., a fluid end). Such association may be in a database entry including identifying information of the consumable component 120.

Furthermore, some embodiments may include calculating and/or tracking a remaining life estimate and/or a probability of survival estimate of the piece of equipment or consumable component based upon the associated job information. Generally, the utilization of wellbore servicing equipment and/or a consumable component thereof may be tracked by considering a "remaining life" estimate of the equipment/component or a "probability of survival" estimate of the equipment/component. Further, the "remaining life" estimate and the "probability of survival" estimate referred to above are terms that are closely tied to results achievable through the methods most clearly explained in the presentation materials titled "Weibull Analysis of Failures with Different Stress Histories," which was authored by Mr. Stanley Stephenson and presented in 2006 at an Applied Reliability Symposium held in Orlando, Fla., as well as U.S. Pat. No. 8,347,957, by Stanley Stephenson et al. The "Weibull Analysis of Failures with Different Stress Histories" presentation material and U.S. Pat. No. 8,347,957 are hereby incorporated by reference in their entirety and may be referred to specifically when helpful to aid understanding of the present disclosure. For example, calculations relating to remaining life estimates and/or probability of survival estimates may be carried out within, and/or on an information handling system storing, a central database 550. Such estimate(s) can then be incorporated into a database entry, such as entry 601 and/or entry 701.

Returning to merging database entries 601 and 701, FIG. 8A is an abstract illustration of a data structure that depicts one example of a merged database entry 801, which may result from merging an entry 601 from the first database with an entry 701 of the second database (e.g., central database 550). As shown in FIG. 8A, entry 701 may be expanded to include the second unique identifier 621 associated with the first unique identifier 611 at the time of scan 730, thereby forming merged entry 801. That is, the entry 801 may show the unique identifier 621 associated with the first unique identifier 611 in the first database based upon, e.g., a dual-scan operation reading both identifiers from two identifier tags at once. Further information about the equipment associated with the second unique identifier 621 (e.g., serial number 622, as shown in FIG. 8A) may be included, as could any additional information associated with that unique identifier 621 (which may include, for example, any of the additional information associated with the first unique identifier 611 in entry 701).

FIG. 8B is an abstract illustration of a data structure depicting another example of a merged database entry, which takes advantage of the time-specific nature of dual scans according to some embodiments. In FIG. 8B, entry 801 includes a history of second unique identifiers (and associated serial numbers) at each past scan recorded during the lifetime of the piece of wellbore servicing equipment 110 having an identifier tag 111 with unique identifier 611 recorded in the database entry 801. In particular, in the example of FIG. 8B, it can be seen that second unique identifier 621 was associated at the most recent scan, dated May 8, 2014 in FIG. 8B, while third unique identifier 831 (associated with a serial number 832 of a previously consumable component previously coupled to the piece of wellbore servicing equipment 110) was associated at a previous scan dated Mar. 1, 2014. In this way, then, the database entry 801 may maintain a time line of the history of all consumable components coupled to (and accordingly at the time of each scan, associated with) the piece of wellbore servicing equipment 110. In certain embodiments, job information may be tracked only with respect to a piece of wellbore servicing equipment 110 (and thereby associated with a first unique identifier 611 in, e.g., database entry 701). Such information may further be associated with a consumable component 120 coupled to the piece of wellbore servicing equipment 110 for the duration of such coupling—for example, by way of the tracking and/or merging illustrated in FIGS. 8A and 8B. That is, merging or other means of associating the consumable component 120 to its coupled piece of wellbore servicing equipment 110 may permit the indirect association of job information pertaining to, and tracked for, the piece of wellbore servicing equipment 110 while the consumable component 120 is coupled to it. In this way, job information may be tracked for the consumable component without the need to separately track such information independently of that which is already tracked for the piece of wellbore servicing equipment 110. In addition, in such embodiments, a remaining life estimate and/or probability of survival estimate particular to the consumable component 120 may be calculated and/or tracked, and further may be associated with, the consumable component 120 based at least in part upon the indirectly tracked job information.

A second example of association of wellbore servicing equipment 110 with a consumable component 120 may be illustrated by the use of a single database (e.g., central database 550). According to this example, the tag reader 410 may be capable of transmitting each dual-scan (e.g., scan data comprising a first unique identifier 611 and a second unique identifier 621) to the central database 550—either directly via communicative coupling, or indirectly (e.g., transmission to the central database 550 by way of a job-site information handling system 570 and/or a remote device 560). The central database entry 801 corresponding to first unique identifier 611 may be accessed and updated with the associated second unique identifier 621. The entry 801 may include any information associated with either unique identifier, as previously discussed. In addition, embodiments according to this example may likewise involve tracking job information only with respect to the piece of wellbore servicing equipment 110, and associating that information with the corresponding first unique identifier 611 in the single database entry 801. Such job information tracked and/or associated with the wellbore servicing equipment 110/unique identifier 611 for the duration of time in which a consumable component 120 is coupled to the equipment 110 may, in turn, be associated with the consumable component 120 (and/or its corresponding unique identifier 621). In this way, then, job information may be indirectly tracked for a consumable component 120 based at least in part upon the tracking of that information with respect to the piece of wellbore servicing equipment 110. And, from that indirectly tracked job information, a remaining life and/or probability of survival estimate for the consumable component 120 may be calculated and/or tracked, and furthermore may be associated, with the consumable component. It may then carry that associated information to its next destination (e.g., when it is moved to a different piece of equipment, and is thereafter associated with a new database entry).

Although the above two examples have been described herein, it will be apparent to one of ordinary skill in the art that any various configurations of database(s) and population of said database(s) may enable association of the wellbore servicing equipment 110 and its consumable component 120. It can also be seen that time-specific association may enable development of a history of associations between a piece of wellbore servicing equipment 110 and various consumable components that may be coupled to that equipment at different points of time (and vice versa for a piece of consumable component 120 and the various pieces of wellbore servicing equipment to which it may be coupled over time). Furthermore, a database entry may be accessed by any various means so as to retrieve the history of associations (e.g., for viewing, for importing into another database, or for other information processing). For example, although FIGS. 6A-8B are representative illustrations of data structures, such could also be a screen output (e.g., on an identifier tag reader 410 and/or on any information handling system) for viewing a database entry according to any of various embodiments.

Furthermore, database population with associated first and second unique identifiers (or any other information for associating a piece of wellbore servicing equipment 110 with its consumable component 120) may take place according to some embodiments in a substantially real-time manner (that is, transmission of information associating first and second unique identifiers to a database may take place upon each dual-scan operation). In other embodiments, database population may instead or in addition be in "batch" mode (i.e., a transmission of information associating multiple pairs of first and second unique identifiers to a database, after multiple scans collect such association data).

In addition, association may be by any suitable means, with or without a database. Example embodiments including databases have been discussed herein for illustrative purposes, and are not meant to indicate the only means of association of first and second unique identifiers 611 and 621 according to the present disclosure.

It will also be appreciated that the present disclosure may be used in conjunction with equipment, systems, and/or methods utilized to gather equipment usage records based on certain variables, such as installation date. For example, Halliburton's Automatic Control Equipment ("ACE") software is currently being used in the field to control Halliburton High Pressure Pumping units and has built-in features to gather, aggregate, and save statistical usage information, such as job information, for various pieces of wellbore servicing equipment and/or consumable components.

The systems and methods of the present disclosure provide many advantages, including but not limited to advanced tracking capabilities. For example, a consumable component such as a fluid end may be tracked in order to accurately collect information about the consumable component, such as its usable lifetime. This could enable accurate and simple data collection regarding parameters such as remaining life estimates and probability of survival estimates, thereby allowing more accurate fits of models, calculations, and other estimation methods of remaining life and/or probability of survival to actual data. Greater accuracy in such estimates may enable greater efficiency in performing a job such as drilling an oil and/or gas well (e.g., by allowing more precise estimates of equipment necessary for the job). The systems and methods of the present disclosure may further promote efficiency insofar as they facilitate tracking of multiple components with which remaining life and/or probability of survival estimates may be associated, thereby enabling more accurate estimation of likely equipment failure due specifically to a consumable component (e.g., due to a consumable component reaching the end of its remaining life). As another example, the systems and methods of the present disclosure may facilitate simplified tracking of multiple interchangeable components (e.g., consumable components swapped in and out of various pieces of wellbore servicing equipment, such as fluid ends swapped among various pumping units). As yet another example, the present disclosure may aid in tracking possible design changes. One could track the usable life span of each of a plurality of the same type of consumable component and compare such life spans. This could be useful, for example, where different consumable components of the same type (e.g., different fluid ends) are purchased from different manufacturers; one could determine the manufacturing source of the longest-lasting fluid ends. Likewise, consumable components of the same type that are subjected to different treatments or other preparations (e.g., fluid ends subjected to different heat treats, geometry changes, etc.) may be compared to find the treatment or other preparation that results in the longest life span of the consumable component. Likewise, consumable components of the same type that are subjected to different operating conditions may be compared to find the operating condition that results in the longest life (e.g., upper limits on pumping pressure for fluid ends, upper limits on time spent in certain gears for engines, etc.). Furthermore, tracking in this manner permits testing of such design changes (e.g., treatments, preparations, operating conditions, manufacturing sources, and the like) without needing to purchase additional equipment and carry out additional tests; instead, such testing may take place through normal operation.

Accordingly, in some embodiments, the present disclosure provides a system comprising: a first identifier tag coupled to a piece of wellbore servicing equipment; a second identifier tag coupled to a consumable component of the piece of wellbore servicing equipment; and an identifier tag reader capable of receiving a first unique identifier from the first identifier tag and a second unique identifier from the second identifier tag, wherein the first unique identifier uniquely identifies the piece of wellbore servicing equipment, and the second unique identifier uniquely identifies the consumable component.

In some embodiments, the present disclosure provides a method comprising: at a first time, reading a first unique identifier from a first identifier tag and a second unique identifier from a second identifier tag, wherein the first unique identifier uniquely identifies a piece of wellbore servicing equipment to which the first identifier tag is coupled, and the second unique identifier uniquely identifies a first consumable component coupled to the piece of wellbore servicing equipment; and associating the piece of wellbore servicing equipment, the first consumable component, and the first time.

In some embodiments, the present disclosure provides method comprising: at a first time, reading a first unique identifier from a first identifier tag and a second unique identifier from a second identifier tag, wherein the first unique identifier uniquely identifies a first piece of wellbore servicing equipment to which the first identifier tag is coupled, and the second unique identifier uniquely identifies a consumable component coupled to the first piece of wellbore servicing equipment; associating the piece of wellbore servicing equipment, the first consumable component, and the first time; decoupling the consumable component from the first piece of wellbore servicing equipment; coupling the consumable component to a second piece of wellbore servicing equipment; at a second time subsequent to the first time, reading (i) the second unique identifier from the second identifier tag and (ii) a third unique identifier from a third identifier tag coupled to the second piece of wellbore servicing equipment, wherein the third unique identifier uniquely identifies the second piece of wellbore servicing equipment; and associating the second piece of wellbore servicing equipment, the consumable component, and the second time.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. The terms in the claims have their plain, ordinary meaning unless otherwise explicitly and clearly defined by the patentee.

What is claimed is:

1. A system comprising:
   a first identifier tag coupled to a piece of wellbore servicing equipment;
   a second identifier tag coupled to a consumable component of the piece of wellbore servicing equipment;
   an identifier tag reader capable of receiving a first unique identifier from the first identifier tag and a second unique identifier from the second identifier tag,
      wherein the first unique identifier uniquely identifies the piece of wellbore servicing equipment, and the second unique identifier uniquely identifies the consumable component; and
   an information handling system communicatively coupled to the identifier tag reader, the information handling system comprising computer-readable media programmed so as to store a database thereon, the database comprising an entry that comprises information corresponding to the first unique identifier and information corresponding to the second unique identifier.

2. The system of claim 1 wherein the identifier tag reader is capable of receiving the first unique identifier and the second unique identifier in a single reading operation.

3. The system of claim 1 wherein the entry further comprises a first set of job information associated with the piece of wellbore servicing equipment.

4. The system of claim 3 wherein the entry further comprises a second set of job information associated with the consumable component.

5. The system of claim 4 wherein the second set of job information comprises one or more of an end of life estimate and a probability of failure estimate of the consumable component.

6. The system of claim 5, wherein the piece of wellbore servicing equipment comprises a pump unit, and wherein the consumable component comprises a fluid end.

7. The system of claim 1 wherein the identifier tag reader is located within the information handling system.

8. The system of claim 1, wherein each of the first and second identifier tags comprises a radio frequency identifier tag, and wherein the identifier tag reader comprises a radio frequency identifier tag reader.

9. The system of claim 1, wherein the piece of wellbore servicing equipment comprises a pump unit, and wherein the consumable component comprises a fluid end.

10. A method comprising:
at a first time, reading a first unique identifier from a first identifier tag and a second unique identifier from a second identifier tag,
wherein the first unique identifier uniquely identifies a piece of wellbore servicing equipment to which the first identifier tag is coupled, and the second unique identifier uniquely identifies a first consumable component coupled to the piece of wellbore servicing equipment; and
recording information corresponding to the first unique identifier, information corresponding to the second unique identifier, and information corresponding to the first time in a database entry to associate the piece of wellbore servicing equipment, the first consumable component, and the first time.

11. The method of claim 10 wherein associating the piece of wellbore servicing equipment, the first consumable component, and the first time takes place at least in part in a database entry.

12. A method comprising:
at a first time, reading a first unique identifier from a first identifier tag and a second unique identifier from a second identifier tag,
wherein the first unique identifier uniquely identifies a piece of wellbore servicing equipment to which the first identifier tag is coupled, and the second unique identifier uniquely identifies a first consumable component coupled to the piece of wellbore servicing equipment;
associating the piece of wellbore servicing equipment, the first consumable component, and the first time;
decoupling the first consumable component from the piece of wellbore servicing equipment;
coupling a second consumable component to the piece of wellbore servicing equipment;
at a second time subsequent to the first time, reading (i) the first unique identifier from the first identifier tag and (ii) a third unique identifier from a third identifier tag coupled to the second consumable component, wherein the third unique identifier uniquely identifies the second consumable component; and
associating the piece of wellbore servicing equipment, the second consumable component, and the second time.

13. The method of claim 12 wherein:
associating the piece of wellbore servicing equipment, the first consumable component, and the first time takes place at least in part in a database entry; and
associating the piece of wellbore servicing equipment, the second consumable component, and the second time takes place at least in part in the database entry.

14. The method of claim 13 further comprising accessing the database entry to retrieve a history of consumable components that have been coupled to the piece of wellbore servicing equipment, said history including: (i) association of the piece of wellbore servicing equipment, the first consumable component, and the first time; and (ii) association of the piece of wellbore servicing equipment, the second consumable component, and the second time.

15. The method of claim 13 wherein the database entry further comprises any one or more of an end of life estimate and a probability of failure estimate associated with any one of: the piece of wellbore servicing equipment, the first consumable component, and the second consumable component.

16. A method comprising:
at a first time, reading a first unique identifier from a first identifier tag and a second unique identifier from a second identifier tag,
wherein the first unique identifier uniquely identifies a first piece of wellbore servicing equipment to which the first identifier tag is coupled, and the second unique identifier uniquely identifies a first consumable component coupled to the first piece of wellbore servicing equipment;
associating the first piece of wellbore servicing equipment, the first consumable component, and the first time;
decoupling the first consumable component from the first piece of wellbore servicing equipment;
coupling the first consumable component to a second piece of wellbore servicing equipment;
at a second time subsequent to the first time, reading (i) the second unique identifier from the second identifier tag and (ii) a third unique identifier from a third identifier tag coupled to the second piece of wellbore servicing equipment, wherein the third unique identifier uniquely identifies the second piece of wellbore servicing equipment; and
associating the second piece of wellbore servicing equipment, the first consumable component, and the second time.

17. The method of claim 16 wherein:
associating the first piece of wellbore servicing equipment, the first consumable component, and the first time takes place at least in part in a database entry; and
associating the second piece of wellbore servicing equipment, the first consumable component, and the second time takes place at least in part in the database entry.

18. The method of claim 17 further comprising building, in the database entry, a history of the first and second pieces of wellbore servicing equipment to which the first consumable component has been coupled, said history including: (i) association of the first piece of wellbore servicing equipment, the first consumable component, and the first time; and (ii) association of the second piece of wellbore servicing equipment, the first consumable component, and the second time.

* * * * *